(12) United States Patent
Kudla et al.

(10) Patent No.: US 9,537,825 B2
(45) Date of Patent: Jan. 3, 2017

(54) GEOGRAPHIC FILTER FOR REGULATING INBOUND AND OUTBOUND NETWORK COMMUNICATIONS

(71) Applicant: IORHYTHM, INC., Austin, TX (US)

(72) Inventors: Aaron J. Kudla, San Marcos, CA (US); Shelby Cain, Andrews, TX (US); Tom Stracener, Andrews, TX (US); Marce Wayne Luck, Studio City, CA (US)

(73) Assignee: IORHYTHM, INC.

( * ) Notice: Subject to any disclaimer, the term of this patent is extended or adjusted under 35 U.S.C. 154(b) by 29 days.

(21) Appl. No.: 14/077,116

(22) Filed: Nov. 11, 2013

(65) Prior Publication Data

US 2014/0075540 A1 Mar. 13, 2014

Related U.S. Application Data

(62) Division of application No. 11/698,624, filed on Jan. 26, 2007, now Pat. No. 8,584,226.

(60) Provisional application No. 60/762,482, filed on Jan. 26, 2006.

(51) Int. Cl.
*H04L 29/00* (2006.01)
*H04L 29/06* (2006.01)
*H04L 29/08* (2006.01)

(52) U.S. Cl.
CPC ....... *H04L 63/0227* (2013.01); *H04L 63/0263* (2013.01); *H04L 63/107* (2013.01); *H04L 67/18* (2013.01)

(58) Field of Classification Search
CPC ..................................... H04L 29/00
USPC ........................................ 455/456.3; 709/238
See application file for complete search history.

(56) References Cited

U.S. PATENT DOCUMENTS

| | | | |
|---|---|---|---|
| 5,606,668 A | 2/1997 | Shwed | |
| 5,835,726 A | 11/1998 | Shwed et al. | |
| 6,130,890 A | 10/2000 | Hahne et al. | |
| 6,496,935 B1 | 12/2002 | Fink et al. | |
| 6,665,715 B1 | 12/2003 | Houri | |
| 6,684,250 B2 | 1/2004 | Anderson et al. | |
| 6,757,740 B1 | 6/2004 | Parekh et al. | |
| 6,850,943 B2 | 2/2005 | Teixeira et al. | |
| 6,873,851 B2 | 3/2005 | Brown et al. | |
| 6,873,988 B2 | 3/2005 | Herrmann et al. | |
| 6,947,978 B2 | 9/2005 | Huffman et al. | |
| 7,100,204 B1 | 8/2006 | Myllumaki et al. | |
| 7,454,523 B2 * | 11/2008 | Chow et al. | 709/245 |
| 7,685,311 B2 | 3/2010 | Friedman et al. | |
| 8,817,658 B2 * | 8/2014 | Gaddis et al. | 370/254 |
| 2003/0041167 A1 | 2/2003 | French et al. | |
| 2005/0163317 A1 | 7/2005 | Angelo et al. | |
| 2005/0239462 A1 | 10/2005 | Omar et al. | |
| 2006/0206624 A1 | 9/2006 | Wang et al. | |

* cited by examiner

*Primary Examiner* — Brandon Hoffman
*Assistant Examiner* — Michael D Anderson
(74) *Attorney, Agent, or Firm* — Gary L. Eastman, Esq.

(57) ABSTRACT

A system and method for regulating and analyzing inbound and outbound communications in and between computer networks on the basis of geographic security assertions are provided. Geographic information is collected, optimized, and shared between network objects to enforce network access control on the basis of configurable security assertions. Security assertions are configured and metrics displayed using maps and other geographic data in a graphical user interface.

20 Claims, 11 Drawing Sheets

Reporting Engine

GEOGRAPHIC FILTER FOR REGULATING INBOUND AND OUTBOUND NETWORK COMMUNICATIONS

RELATED APPLICATIONS

This application is a divisional application of U.S. patent application Ser. No. 11/698,624, filed Jan. 26, 2007, which claims priority from U.S. Provisional Application No. 60/762,482 filed on Jan. 26, 2006, which are hereby incorporated fully herein by reference into this application.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention relates to the art of utilizing geographic information as a basis for network access control, specifically, the extraction and analysis of IP protocol attributes for the plurality of packets traversing a data network, resulting in real-time classification of said packets in a manner that facilitates responses based on a set of pre-defined, geographic, security assertions.

2. Background of the Invention

The firewall has long been the de facto standard of network perimeter defense, guarding computer resources from unauthorized access by regulating the transmission of data packets to protected devices according to a rule-set. Presently, most network firewalls perform a diverse range of functions, including Network Address Translation (NAT), support for virtual private networking (VPN), stateful TCP/IP connection tracking, as well as, other sophisticated techniques of analyzing packet and protocol characteristics. One example of such a device is Checkpoint's Firewall-1, a product described by U.S. Pat. Nos. 5,606,668, 5,835,726, 6,496,935, 6,873,988, and 6,850,943.

Generically, firewalls operate primarily by analyzing network traffic using a pre-defined set oaf rules that determine how data packets are processed. One limitation of firewalls is that their operation is dependent upon the information contained within networking protocols. Information external to a protocol, information not contained within the syntactic construction of a data packet of a specific protocol type, presents a challenge to firewall technology in relation to that protocol in the form of a blind spot. This blind spot constitutes a set of unknowns, various information states that the firewall cannot observe or measure, but must either infer through some mechanism or obtain via interoperation with another device or devices with different views of the network or the given protocol. It should be noted that this problem is not unique to firewalls, but is also affects Intrusion Detection Systems (IDS) and Intrusion Prevention Systems (IPS) systems, a weakness systematically documented in Ptacek and Newsham's classic paper, "Insertion, Evasion, and Denial of Service."

This fundamental limitation has led to the development of diverse firewall technologies in recent years. This technological growth can be characterized, broadly, as following two lines of development, each line addressing the basic "blind spot" limitation through a different technological track.

One line of development has focused on improving the firewall's ability to decode, analyze, and track the state of information passing between computer systems on a data network. This type of technology is often referred to as a stateful packet-filter. One example of technological innovation in the area of protocol processing is Checkpoint's U.S. Pat. No. 5,606,668, facilitating the stateful inspection of TCP/IP segments. This technology addresses the blind spot problem by allowing the firewall to better maintain state between machines communicating through the firewall and by accurately tracking the connection state between systems traversing the firewall.

Checkpoint's Stateful Inspection technology, while a fundamental innovation in the field, addresses the blind spot problem only in part. The position of a device on a network and the information available from its localized point of processing introduces a fundamental myopia that even perfect protocol analysis and session state tracking cannot eliminate. This has led to a second line of evolution within firewall technologies, the development of new species of firewalls designed to address a different dimension of their limitations. This diversification of firewall technology includes Host-based "personal" firewalls, application-layer firewalls, and specialized proxy-firewalls, to give a few examples.

Despite the proliferation of firewall and hybrid IDS/IPS technologies and the protection that these technologies provide there exists a need to regulate network access control for IP networks on the basis of the geographic location of network entities. The inability to preemptively block or otherwise respond to network data packets in real time on the basis of geographic location has been a longstanding limitation of firewall technology. Since the information necessary for determining the geographic location of a datagram or TCP segment is, principally, meta-information external to IP-based protocols, this type of access control has its own unique challenges.

Since the turn of the century, numerous geographic-based IP technologies have emerged, some specifically related to firewalls and access control. One example of a geographically aware firewall technology is described by U.S. Pat. No. 6,839,852, owned by McAfee. This technology is a host-based firewall program described as capable of retroactively tracing the geographic origin of a network event logged by the firewall. However, it does not block inbound or outbound network traffic based on geographic factors and thus still suffers from the same geographic blindness as predecessor technologies.

With the McAfee exception, patented geographic technologies seem to have been mostly developed over the last few years, largely to meet market demands in the area of advertising and marketing, but with interest growing in the application of Internet Geolocation technology to network and application security. A number of patents have been granted to Internet Geolocation companies, most prominently: Digital Envoy, Inc, U.S. Pat. No. 6,757,740, Quova, Inc., U.S. Pat. No. 7,072,963 and U.S. Pat. No. 6,684,250, IBM Inc., U.S. Pat. No. 7,100,204, inventor Cyril Houri, U.S. Pat. No. 6,665,715, and US patent application 20060206624, concerning a technology for determining the geographic location of web resources. Recently, the NSA was also granted a patent related to determining the geographic location of a networked entity, described by U.S. Pat. No. 6,947,978.

Additionally, many companies currently license Internet Geolocation databases containing mappings between IP addresses and geographic information at various degrees of granularity. The application of geolocation technologies to the field of computer and data network security is occurring both commercially and, at a grass-roots level, with the commercial technologies primarily focused on geolocation at the Application-Layer (OSI Model Layer 7) focused mainly to combat the widespread phenomena of Identity Theft and Internet fraud. At the grassroots level, various individuals, organizations, and projects are using geographic information in creative ways, such as D-Shield (www.d-shield.org), which utilizes firewall logs voluntarily uploaded by users to create a global picture of network attack patterns and trends. Other individuals and organizations have authored scripts and tools for converting geographic databases and information from Regional Internet Registrars (RIRs) into firewall rules, with notable work being done for the Linux firewall netfilter.

Efforts to adapt existing firewall and Access Control List (ACL) technologies, like routers, to the challenges of enforcing geographic-based rules use a number of techniques, most with serious disadvantages. Conventionally, these approaches have involved a time-consuming manual processes, carried out on a piece-meal basis. For example, creating geographic rules for a firewall typically involves using or writing a Perl script to parse a list, or using an existing database by importing its contents into a SQL-based database, and then using SQL queries to generate firewall rules for the desired regions or countries. These rules are then imported or added into the firewall rule-set or used for modifying SMTP server configurations to reject mail from particular geographic areas. Such processes are time consuming due to the need for precise syntax within the constructed rules, and overall involve a lot of line-by-line proofing or fluency with the use of Unix/Linux regular expressions, as well as, a scripting language, commonly Perl.

Second, existing firewall technologies are largely unsuited for using complete geographic rule-sets, such as a rule set constructed from a RIR delegated list or created from a geographic database, as such rule sets can easily comprise over 100,000 rules. Utilization of geographic rules within firewall or router technologies is only efficiently implemented on a very selective basis due to the information processing demands of very large rule sets. This problem is further exacerbated within enterprise networks that operate at gigabit speeds. As a result, the full benefits of geographic protection are never realized.

Implementing an exhaustive and regimented policy of geographic access control for even a single network device is highly impractical using existing firewall technologies. These performance limitations, coupled with the highly manual volume of administration required to update and maintain a large cumbersome rule-set presently excludes most enterprise networks from realizing the benefits of geographic security controls enforced via access control technology. Due to the limitations in existing technologies to provide effective geographic based network access control we decided to approach the problem area in a different way abandoning the limitations of the firewall and its kin.

We refer to this new technology, as Geographic Threat Protection, or GTP. This technology offers significant benefits for any network protected by a GTP service or device in terms of enhanced defense in depth for network security. Another example of the technology would allow companies to enforce network access control policies where traffic from only the countries they do business with would be allowed. Thus, bandwidth can be saved by blocking unwanted network traffic from countries the company doesn't do business with, in addition, to the multiple security benefits of such a technology.

The creation of GTP technology was driven by events, both recent and historical, and by a realization of vulnerability inherent in the Internet on which both business and government increasingly depend: from Perl Harbor to 9/11, the United States has occasionally been blindsided by an enemy which strikes without warning. Geographic Threat Protection is a sound defensive measure to prevent sudden and devastating attacks against U.S. companies and US critical infrastructure from the Internet.

We believe that geographic threat protection will make the United States and its corporate and government networks more defensible, less vulnerable to Internet-Based threats. Today's Internet is the fulfillment of the grand dream of open networks, of a world in which a computer in South Africa, or a Pakistan, North Korea, or Poland can communicate with a network in West Texas: any node can exchange information with any other node, seamlessly. What has become increasingly evident over time is that the lack of geographic security controls means any Internet-enabled system is exposed, surrounded, seated in an electronic world without borders, terrain, or obstacles. This is perhaps the strictest definition of an indefensible position. While Firewalls can protect a network from outside access, they cannot regulate such activity on the scale of geographic regions as is done with GTP. Nuclear power, electrical plants, petroleum refining, mass production, commerce, and e-commerce all rely upon a network of interconnected systems in which any node on the network is adjacent. An Internet enabled network is perpetually surrounded, with only the firewall and intrusion prevention system to forestall attack, and these, lack any a priori visibility of the geographic origin of incoming attacks. With geographic knowledge, the vast majority of internet-based attacks can be blocked before they occur. In the latest Internet Threat Report from Symantec, over 70% of attacks detected came from non-US IP addresses, thus, one can see the potential security benefits possible with blocking traffic based on country of origin.

SUMMARY OF THE INVENTION

The invention provides a special type of packet filter suited as a firewall for the Internet Protocol versions 4 and 6, as well as, encapsulated protocols, based on geographic location data using a pre-configured rule-set. Specifically, a method and apparatus is described for a "geographic filter" that either directly processes or indirectly facilitates the processing thereof a plurality of data packets, and enables the use of specified actions against the individual packets comprising the plurality of packets based on a user configurable rule set in which geographic identifiers are paired with device actions.

The packet filter monitors network traffic and extracts information from each datagram or segment traversing a network link, then analyzes this information in real-time by parsing the packet or segment accordingly and referencing the parsed information within a memory structure specifically designed for holding geographic, and related, data. A device action, informally a routing or logging decision, is made with regard to each datagram on the basis of high-level rules that relate to the contents of the memory structure (i.e. the geographic classification engine) in a generic manner.

Ordinary firewalls consist of low-level rules central to the operation of the device, and thus constructing these rules on the basis of available geographic mappings between IP addresses and geographic locations requires thousands of rules due to the large number of address ranges or CIDR blocks involved in such a mapping. Additionally, traditional firewalls receive incoming protocol traffic, then decode and analyze this traffic, and the analyzed attributes of the datagram are compared to the device rule-set in a manner that approximates sequential or line-by-line comparison. A traditional firewall without explicit rules blocks nothing.

The advantage of this architecture is that the device requires very few rules, and those rules that are required are relatively simplistic. Access control by the geographic filter is performed by an engine separate from the rules themselves. Thus the device is preconfigured, at which point the rules cease to be of actionable importance and do not themselves factor into access control activities. Once configured, the device does not rely on rules in the ordinary sense, but rather, a specialized memory structure similar to a routing table, which contains all the necessary information determining the appropriate action to take upon the datagram or segment.

According to one aspect of the invention is a method of blocking, allowing, logging, or redirecting TCP/IP network traffic on the basis of an abstract rule-set used during the configuration of a geographic classification engine. The method consists of a packet filter designed to respond to the directives of a memory structure maintaining table mappings of the IP protocol address space. The computation involves the analysis of an IP address and possibly the permutation of an IP address into another entity such as a 32 bit integer or via association with a database of related information. Abstractly, the IP address is one possible value of a resource identifier, and the lookup or comparison of the resource identifier value to the contents of a memory structure results in access control decisions by the device.

DETAILED DESCRIPTION

Figure 1:
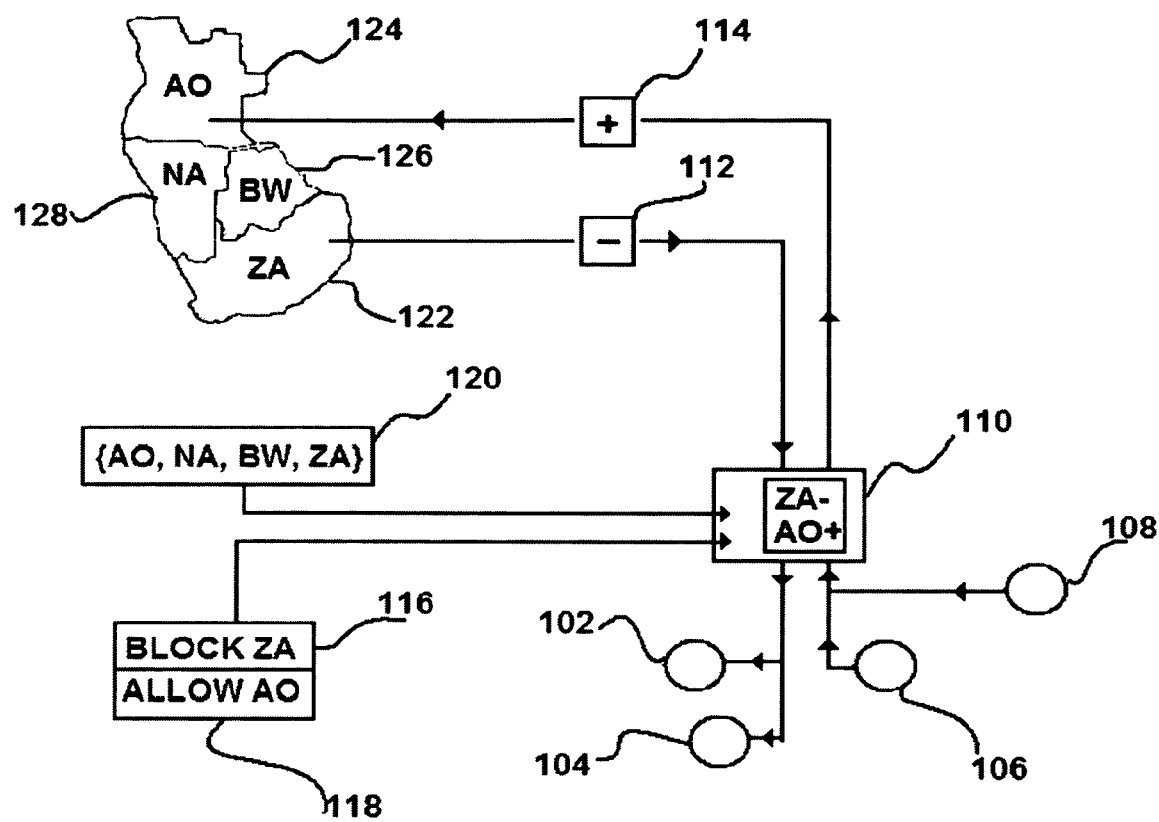
FIG. 1 is an example of a geographic filter device.

A detailed description is provided for a geographic filter device that implements processes of analyzing and conditionally responding on the basis of geographic associations of inbound and outbound network communications. The geographic filter device consists of a set of engines and modules which internalize functions for the following:

A set of configuration functions relating to input, input optimization, and communication of processed configuration directives to other functional groups, comprising: a means for receiving input from a user interface, and a means for optimizing said input by converting the configuration information into generic device instructions, a means of extracting configuration information or stored state information from a functional module exported to a storage media or transmitted between networked nodes, and outputting processed input to other functional groups. A set of input parsing and encoding functions for receiving, structuring, and producing output in accordance with three input modes and three output modes, and the programmatic means for switching between the various input and output modes. These and other functions are performed by the Configuration Post-Processing Engine 404 shown in FIG. 4.

A set of functions to prepare a media for parsing utilizing a means of retrieving from a location, opening, and reading the source media, in accordance with a media interface function and a media reading function. These and other functions are performed by the Functional Input Engine 402 shown in FIG. 4.

A set of functions for processing geographic information by means of which geographic information is stored, categorized, and indexed, enabling a programmatic means for mapping IP addresses to geographic regions and retrieving said mappings or geographic associations related to said mappings, on demand, including, a means for analyzing a security assertion into a set of IP address blocks associated with device actions; a means for loading particular IP address blocks into a memory structure; a means for comparing an IP address provided as input with the IP addresses stored within a memory structure. These and other functions are carried out by the Geographic Filtering Engine 408 in FIG. 4.

A set of functions for interfacing with a network through a network interface, including a means for: performing an action on a network packet, initiating a response to a network packet, logging actions and responses in accordance with operational parameters. These and other functions are carried out by the Network Filtering Engine 412 in FIG. 4.

A set of functions for manipulating system output, including: parsing output based on operational parameters, writing output to a variety of media types, or outputting information in accordance with a feed or stream in real-time to another network object. These and other functions are performed by the Transcoding-Output Engine 414 in FIG. 4.

A set of functions whereby system operation is reported to a user or process, the format of said reporting including: reporting in a generic format as determined by operational parameters, reporting information by writing files to a local or remote file system, reporting to a network process or service, reporting to a database via an ODBC operation. These and other functions are performed by the Reporting Engine 416 in FIG. 4

A set of user interface functions reporting the result of logging activities to a user, the operation of said functions involving a Graphical User Interface (GUI) in which Device Action events are displayed visually on a map in accordance with user configurable criteria for the purpose of altering, changing, or establishing device configuration parameters as relating to reporting activities, including the display of said device action events depicted visually in accordance with spatial and geographic relationships. These and other functions are carried out by the User Interface Engine 406 in FIG. 4.

Referring now to FIG. 1, an example geographic filter device and a basic geographical topology is shown. In this example, the four network nodes 102, 104, 106, and 108, connect through the geographic filter device 5. Other network objects such as firewalls, routers, switches, VPNs, etc., may be present, but are not shown. Within the context of the diagram, network nodes 102, 104, 106, and 108, are network nodes protected by the geographic filter device 110. To be more specific, 102, 104, 106, and 108 are network objects, such as subnets, servers, services running on hosts, or any other type of appliance or device capable of communicating a network. Network objects, 102, 104, 106, and 108 are protected by the geographic filter device 110 in virtue of the placement or location of 110 within the network architecture. Inbound communication from geographic region ZA 122 must pass through the geographic filter device 110 when transmitting to network objects 102, 104, 106, and 108. Conversely, outbound communication from network objects 102, 104, 106, and 108 must pass through the geographic filter device 110 which mediates communication with external regions, such as region ZA 122, and region AO 124. Hence 102, 104, 106, and 108 are protected network objects in relation to the geographic filter device 110.

The geographic filter device 110 in FIG. 1 is configured with network information related to defined regions AO 124, NA 128, BW 126, and ZA 122. For simplicity, this and future examples, we shall consider regions 122, 124, 126, and 128 to constitute the totality of geographic regions configured for the geographic filter device 110. In actual implementation, the scope and detail of geographic filtering activity may be as limited as to apply to one subnet within one geographic region, or as broad to include the entire world.

In FIG. 1, 120 is the information used during the configuration of geographic filter device 110. The Information (geographic) 120 can be sourced from a variety of sources: a proprietary database, a public list of such information, extracted from HTML documents, or remotely retrieved from other geographic security devices, etc., however, the completeness, accuracy, and timeliness of the information is quite important as the provided information 120 will determine the accuracy and overall effectiveness of device 110. Information 120 is processed by the geographic filter device 110 when geographic security assertions 8, and 9, are supplied. The geographic security assertions 116, 118 are defined in relation to the information 120, thus arriving at a low-level definition of the geographic security assertions. One example of a low-level definition or translation of a geographic security assertion 116 is to convert "ZA" into a set of IP address blocks or ranges, and thus to apply the defined action "BLOCK" to the range or blocks of IP addresses constituting the low-level definition of "ZA". The result of the processing is the representation of geographic security assertion 116 into a compact form, henceforth, referred to as the compact representation, within the geographic filter device 110, as shown in the diagram above abbreviated as "ZA–". Conversely, the compact representation of geographic security assertion 118 is "AO+", attained once again via processing the geographic security assertion 118 in relation to the information 120, arriving at the abbreviated low-level definition.

Calculating the compact representation of a geographic security assertion 116 involves translating or defining the high-level elements of the assertion into low-level constitutive elements. Once processing is complete, the low-level constituents must map or relate to protocol characteristics defined within Information 120 and associated with geographic regions or information related to geographic regions. The symmetry between the protocol characteristics of the low-level constituents in relation to Information 120 allows the geographic security device 110 to take selective action on network information by basing that action upon low-level protocol characteristics extracted from incoming network information. The veracity of Information 120 ensures that the filtering of traffic on the basis of low-level constituents accurately implements the geographic security assertions and reflects the geographic relationships embodied in those assertions. A security assertion such as "BLOCK ZA" is translated on the basis of Information 120 into an actionable set of low-level protocol characteristics, which can be detected in incoming and outgoing network communications. In one example, network information inbound from ZA is blocked 112 by the geographic filter device 110 on the basis of the detection and response to protocol characteristics contained within the communication stream and represented within the geographic filter device 110 as the low-level constituents "ZA–". In another example, outbound traffic to region AO 124 is allowed by the geographic filter device on the basis of the low-level constituent definition "AO+".

Figure 2:
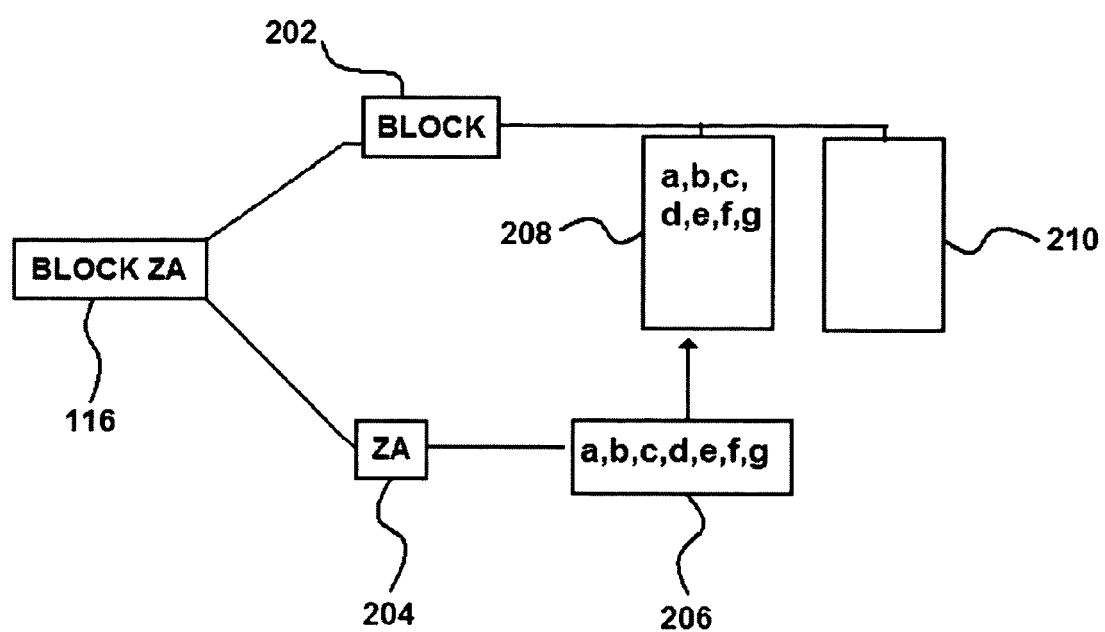
FIG. 2 shows a base formal translation within a geographic security assertion.

A key aspect of the functioning of the geographic filter device has been glossed over, namely, the relationship between security assertions and the low-level constituent definitions of such assertions within the geographic filter device. FIG. 2, shows the logical relationship between security assertions and low-level constituent definitions in more detail. In a traditional firewall, the "security rules" play an integral role in device functioning, so much so, that a firewall without rules does nothing. Moreover, rules occupy a central space within firewall memory and play an integral function in determining which packets are allowed to pass and which are dropped by the device. Unlike a firewall, the geographic filter device has no rules in the ordinary sense of a firewall rule. Rather, preliminary processing of a geographic security assertion 116 eliminates the assertion and replaces it with an equivalent representation of low-level constituents 206. Additionally, as a result of this processing, the mode in which the constituents are instantiated within the geographic filter determines a security action. As such, actions by the geographic filter device that block or drop traffic, allow traffic, reroute traffic, log traffic, etc., are determined by a contextual property of a memory structure 208 rather than the syntactic and semantic properties of a rule.

Terminologically, a geographic security assertion 116 is parsed into a Resource Identifier 204 and a Device Action 202. The Device Action 202 determines the contextual mode of storage 208. A "Resource Identifier" a term that describes an object or token extracted from Information 120, FIG. 1, and employed during the operation of a geographic filter. Importantly, Resource Identifiers have various levels of cardinality as determined by the totality of geographic relationships extracted from Information 120, in FIG. 1. Resource Identifiers such as "Europe", "Asia", "Eurasia", "United States", "US", "Texas", or "TX" are all valid Resource Identifiers, thus a challenge is introduced. Resource Identifiers must be translated into actionable sets of low-level protocol attributes in order to have meaning within the geographic filter device. Within security assertions, Resource Identifiers can be of a highly general type, as can Device Actions. Thus security assertions can be of varying degrees of generality, the most general being, sentential construction in a language such as English. Natural language geographic security assertions we refer to as "informal." Such assertions could then be processed via a natural language interpreter into a formal representation, that is, a uniform syntax usable by the geographic filter. For example, a formal geographic security assertion could be derived by parsing the following informal sentence. Note, natural language processing is not required, as an informal geographic security assertion could be build using a series of World maps or more germanely by using an "Assertion Wizard" within a Graphical User Interface, allowing the user to choose pre-defined words and phrases when creating an informal geographic security assertion:

(Example. 1)"Do not allow any network traffic to be sent or received from South Africa"

(Example. 2)"Only allow network communication from NATO countries"

FIG. 2, shows the base formal translation of (Example. 1) within geographic security assertion 116. This formal geographic security assertion is then broken apart into a Device Action "BLOCK" 202, and a Resource Identifier "ZA" 204. The Resource Identifier 204 is further broken down through successive processes of definition into a low-level set of constituents 206. Example of a low-level protocol constituent would be an IP address expressed as a 32-bit integer, in a Start-End block format. The full set of low-level constituents a,b,c,d,e,f,g 206, would constitute the totality of low-level constituents derived from the Resource Identifier "ZA" 204. Finally, the low-level constituents 206 are instantiated into a memory structure 208. Contextually, placement within memory structure 208 determines the device action "BLOCK" for all low-level constituents 206 processed by the information processing architecture of 208. In a highly simplified example, memory structure 208 can be thought of as a list, and thus the act of placing constituents 206 within the memory structure list 208 results in the Device Action of "BLOCK" being applied to any network traffic exhibiting the protocol attributes or characteristics stored within memory structure list 208. If the protocol attributes were stored in memory structure list 210, the Device Action would differ, for example, "ALLOW.

In (Example 2) the scenario is more complex, as "NATO Countries" is an abstract Resource Identifier, the meaning of which can change based on international politics. Thus accurately translating this assertion requires an accurate list of NATO membership and the ability to translate "NATO Countries" into a list of formal Resource Identifiers corresponding to NATO membership. As such, the translated rule will consist of multiple formal Resource Identifiers and one Device Action.

Having provided a very general description of the operation of a geographic filter, it will now be explained in more detail how the matching of low-level constituents derived from Resource Identifiers to a protocol communication channel results in the performance of Device Actions.

Figure 3:
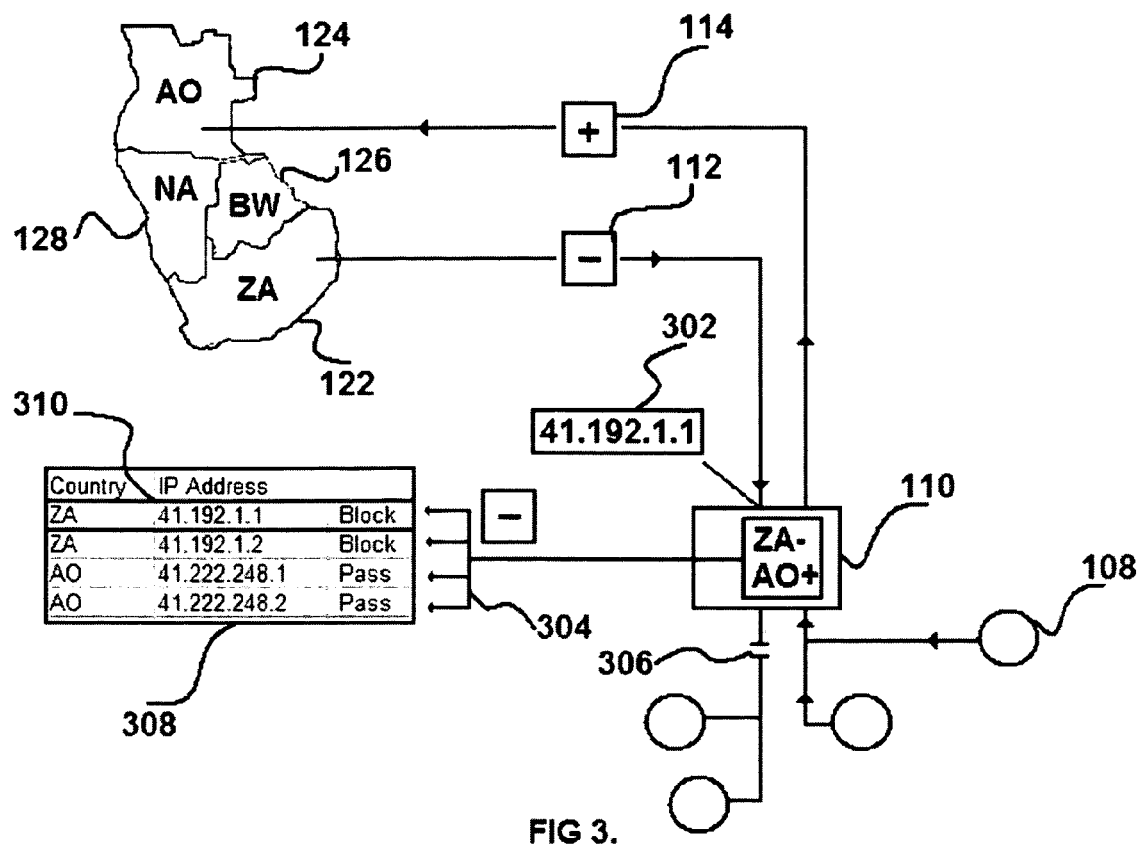
FIG. 3, shows an example geographic filter device performing a device action within a basic geographical topology.

FIG. 3, shows an example geographic filter device performing a device action within a basic geographical topology. The geographic filter device 110 examines all inbound and outbound network communications which it has been configured to monitor. The network object 108 is shown communicating with geographic region "AO" 124, the flow of the directional arrows indicating the direction of the traffic originating from 108 and transmitting to geographic zone "AO" 124. Additionally, geographic region "ZA" 122 is depicted as attempting to communicate through the geographic filter device 110, the directional arrows indicating network traffic inbound to the geographic filter device 110.

The memory structure 308 is depicted as containing among other things a list of IP addresses. Note, memory structure 308 is depicted in FIG. 3 in a highly generalized manner, that is, memory structure 308 would in actuality not contain information such as "ZA" or "Block", but it would only contain IP addresses. Overlooking this for now, it can be said that memory structure 308 when in operation approximates the function of examining the incoming communication pathway and the outgoing communication pathway for the purpose of performing Device Actions on the communication pathways. Device Actions are triggered by memory structure 308 in virtue of examining the incoming and outgoing communication pathways and matching low-level protocol constituents contained within 308 with low-level protocol attributes within either communication pathway.

A successful match is shown in FIG. 3, along with the performance of a Device Action. Memory structure 308 location 310 contains within it the low-level constituent "41.192.1.1" shown in memory location 310. The low-level constituent "41.192.1.1" 310 is a constituent of geographic region "ZA" as shown in memory location 310. The incoming communication pathway is examined, or parsed to be more specific, and protocol attributes are extracted. The result of this operation is the extraction of 302, a low-level protocol attribute 302 of the incoming communication channel. Next, this extracted protocol attribute 302 is compared against the content of memory structure 308 to determine if a matching low-level constituent exists within the memory structure. This process of comparison, or analysis, involves searching through, or iterating over, the contents of the memory structure 308 and comparing the value of the extracted protocol attribute 302 to the value of the constituent values contained within 308. A positive match in this case occurs when searching memory location 310, resulting in the performance of the Device Action "BLOCK", as indicated by juncture 306. Transmission of the inbound communication channel to other systems is prevented as a result of the positive match. In this example, the return value of the analysis operation performed in 304 is the Device Action "BLOCK" indicated by the minus sign 112. This Device Action is applied to the inbound communication pathway, as shown in 112.

Returning briefly to FIG. 1, the geographic filter system has two main configuration pathways: Information 120 and geographic security assertions 116, 118. Other configuration pathways exist and will be the subject of later discussion. Although the general aspects of the overall functioning of the geographic filter device 110 have been described, comparatively little has been said about the characteristics of information 120 and how this information enables the translation of geographic security assertions 116, 118 into low-level constituents. This functionality will now be explored in greater detail.

In order to explain the process whereby geographic security assertions are reduced to low-level constituents, it is helpful to consider a basic scenario. First, as previously discussed, configuration information regarding geographic regions or data related to those regions can be input in the form of a list. A common example of such a list is a delegated-list as published by Regional Internet Registrars (RIRs) such as ARIN, APNIC, AFRINIC, LACNIC, or RIPENCC. Geographic information is also available from other sources, such as public or licensed geographic databases. For purposes of explanation, we will show the use of an RIR delegated list. The underlying mechanisms are the same regardless of the media type used to supply the geographic information. Our scenario will be further simplified by the assumption that the world consists only of geographic regions ZA ("South Africa"), BW ("Botswanna"), AO ("Angola"), and NA ("Nambia"). Additionally, the location of the geographic filter will be excluded from the example, as consideration of this location is unnecessary for the purpose of explaining the processing and utilization of configuration information.

The RIR delegated list for AFRINIC in our example consists is a list of "316 lines"; each line corresponds to an IP address range associated with a Country. Country Codes within this example are ISO 3166 Country Codes as maintained by the International Organization for Standardization. The portion of the delegated list relevant for BOTSWANA (BW) is shown below, containing "2 lines" (Example 3):

```
afrinic|BW|ipv4|196.1.130.0|1024|19940509|assigned
afrinic|BW|ipv4|196.45.164.0|1024|20050705|allocated
```

The portion of the delegated list relevant for NAMBIA (NA) is shown below, containing 7 lines (Example 4):

```
afrinic|NA|ipv4|196.1.28.0|1024|20041027|allocated
afrinic|NA|ipv4|196.3.94.0|256|19950404|assigned
afrinic|NA|ipv4|196.20.0.0|8192|19950103|allocated
afrinic|NA|ipv4|196.44.128.0|8192|20010621|allocated
afrinic|NA|ipv4|196.45.0.0|4096|20021004|allocated
afrinic|NA|ipv4|196.216.32.0|8192|20050823|allocated
afrinic|NA|ipv4|204.152.14.0|512|19941013|assigned
```

The portion of the delegated list relevant for ANGOLA (AO) is shown below, containing 9 lines (Example 5):

```
afrinic|AO|ipv4|41.222.248.0|2048|20060313|allocated
afrinic|AO|ipv4|41.223.0.0|1024|20060309|allocated
afrinic|AO|ipv4|196.29.192.0|4096|20000724|allocated
afrinic|AO|ipv4|196.32.192.0|2048|20051207|allocated
afrinic|AO|ipv4|196.45.160.0|1024|20040615|allocated
afrinic|AO|ipv4|196.46.72.0|2048|20050810|allocated
afrinic|AO|ipv4|196.202.252.0|1024|20050419|allocated
afrinic|AO|ipv4|196.216.136.0|1024|20060120|allocated
afrinic|AO|ipv4|196.223.1.0|256|20060105|assigned
```

The portion of the delegated list relevant for South Africa (ZA) is shown below, containing 298 lines (Example 6):

```
afrinic|ZA|ipv4|196.11.117.0|1280|19940710|assigned
afrinic|ZA|ipv4|196.11.122.0|256|19941109|assigned
afrinic|ZA|ipv4|196.11.123.0|256|19940710|assigned
afrinic|ZA|ipv4|196.11.124.0|256|19940524|assigned
afrinic|ZA|ipv4|196.11.125.0|2560|20020521|assigned
afrinic|ZA|ipv4|196.11.136.0|2560|19941109|assigned
afrinic|ZA|ipv4|196.11.146.0|1024|19940710|assigned
afrinic|ZA|ipv4|196.11.160.0|2560|19940710|assigned
afrinic|ZA|ipv4|196.11.170.0|1280|19940524|assigned
afrinic|ZA|ipv4|196.11.188.0|256|20021120|assigned
(list truncated)
```

Taken together, the associated information for ZA, BW, AO, and NA constitutes the totality of geographic information available to the geographic filter device. This information is next processed from its raw form into a format the geographic filter system may utilize for further operations. Additionally, a unique parsing mechanism is employed, a mechanism that is programmatically capable of reading in the syntax of the RIR delegated list for AFRINIC.

Figure 4:
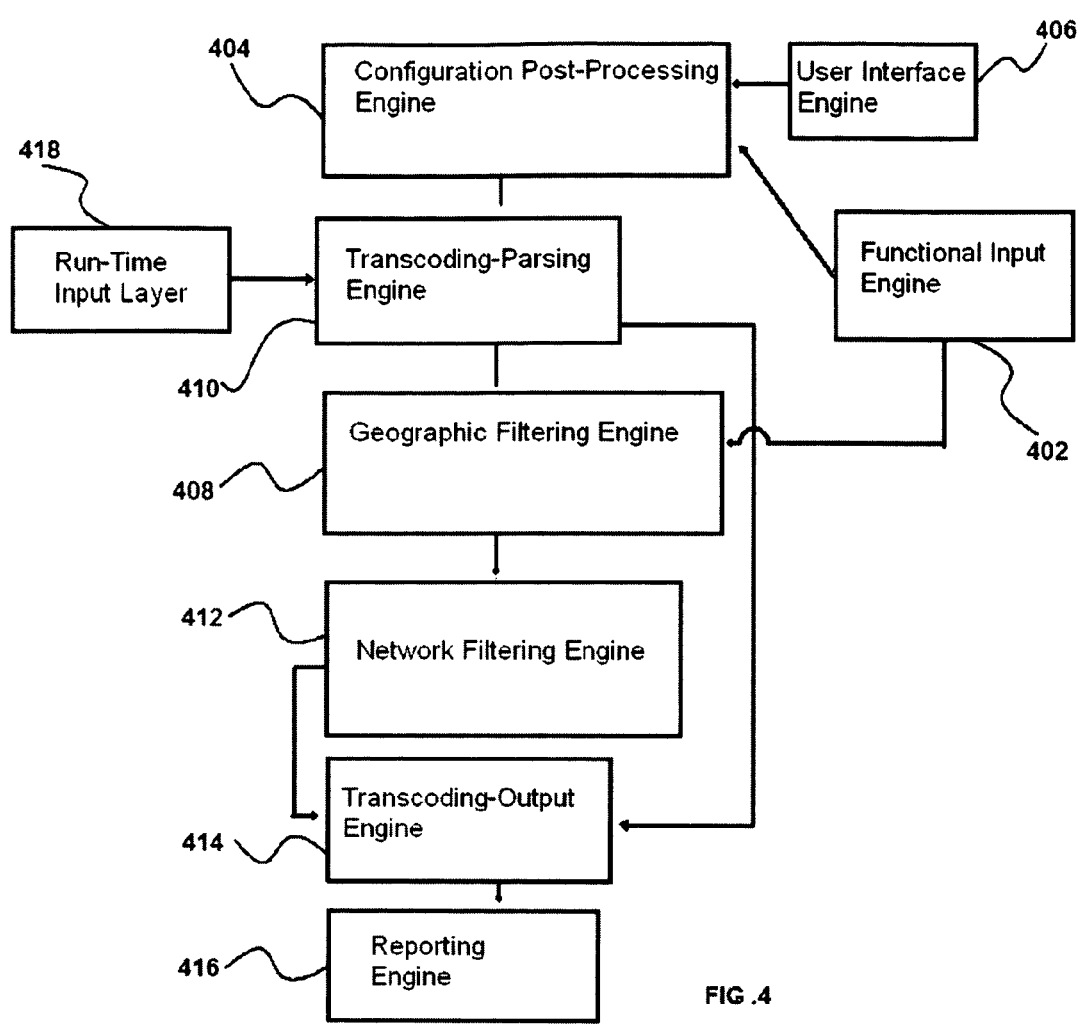
FIG. 4 demonstrates unique parsing mechanisms within a specialized input processing engine.

FIG. 4 demonstrates the unique parsing mechanisms that most exist for any media type used the geographic filter, and the embodiment of such parsing within a specialized input processing engine, the Functional Input Engine 402.

In our example, the RIR delegated list for AFRINIC is read in by the Functional input Engine 402, the information passed to the Configuration Post-Processing Engine 404 for encoding, conversion, and optimization processes. By process of encoding the data from the delegated list is extracted according to a parsing algorithm, and non-relevant segments of the data are trimmed off or discarded. For instance: The portion of the delegated list relevant for BOTSWANA (BW) is shown below, comprising 2 lines (Example 7):

```
(afrinic,BW,196.1.130.0,1024)
(afrinic,BW,196.45.164.0,1024)
```

Once encoded in this format, the concept of a line is purely an analogy, as the representation is no longer a literal line in a text file, but a member of a set having a particular address in memory. Regardless, the analogy of lines will be continued for the sake of simplicity.

Conversion processes take place within the Configuration Post-Processing Engine 404, involving the translation of particular units of information into alternate forms. One way to convert the IP address 196.1.130.0 is to convert it into a 32-bit integer, as shown in Example 8 below. The result of this conversion would produce the following data set (Example 8):

```
(afrinic,BW,3288433152,1024)
(afrinic,BW,3291325440,1024)
```

Next, an optimization algorithm is performed over the converted data set. Depending upon the type of conversion operation the method of optimization may differ. In the case of 32-bit integers, one key manner of optimizing the data set in (Example 8) is to combine contiguous network ranges. Another method of optimization for "dotted quad" representation of (Example 7) is to perform a "Uniqueness" operation. In Example 7, the parsing process produces an IP address followed by the number of IP addresses contiguous with the starting address, thus 196.1.130.0 is followed by 1024 possible IP addresses. Thus BW has been assigned the address 196.1.130.0 and the following 1024 contiguous addresses for use. Additionally BW has also been assigned a different network range for use, the 196.45.164.0 starting address followed by 1024 possible IP addresses contiguous with that starting address. A "Uniqueness" optimization would begin with the first octet of the IP address in the first row of data and compare this octet to the leading octets of the IP addresses for all other countries in the totality of the geographic data set. In our specific example, the IP address assignments for AO, ZA, and NA would be searched for a leading octet of the value "196." if this value were not present in any of the other IP address assignments for AO, ZA, and NA, then all addresses within BW would be optimized into the largest possible network representation that does not change the base IP address, as shown in (Example 9):

(afrinic,BW,3288433152,16,000,000)

This type of data compression is reliable because there are no other IP addresses beginning with "196." assigned to any other geographic regions. In CIDR notation, the "Uniqueness" algorithm would produce the following CIDR block (Example 10):

(afrinic,BW,196.0.0.0\8)

The application of compression algorithms to the geographic information thus allows rows to be eliminated from the total dataset, either through collecting and compressing contiguous network blocks or through uniqueness operations. The benefit of reducing the dataset is that it becomes necessary to search through fewer regions of memory when attempting to locate an IP address within a list of IP addresses. Through the application of a "Uniqueness" algorithm it is possible to produce vastly smaller data sets during conversion and optimization algorithms. For instance, applying the "Uniqueness" algorithm to the geographic data set for South Africa ("ZA") dataset has the following (Example 11), containing "87 lines":

```
afrinic|ZA|ipv4|196.11.117.0|1280|19940710|assigned
afrinic|ZA|ipv4|196.11.122.0|256|19941109|assigned
afrinic|ZA|ipv4|196.11.123.0|256|19940710|assigned
afrinic|ZA|ipv4|196.11.124.0|256|19940524|assigned
afrinic|ZA|ipv4|196.11.125.0|2560|20020521|assigned
afrinic|ZA|ipv4|196.11.136.0|2560|19941109|assigned
afrinic|ZA|ipv4|196.11.146.0|1024|19940710|assigned
afrinic|ZA|ipv4|196.11.160.0|2560|19940710|assigned
afrinic|ZA|ipv4|196.11.170.0|1280|19940524|assigned
afrinic|ZA|ipv4|196.11.188.0|256|20021120|assigned
afrinic|ZA|ipv4|196.11.192.0|1280|19940524|assigned
(list truncated)
```

The data set resulting from converting this optimized set to 32-bit integers and further compressing contiguous blocks is shown below (Example 12), containing "75 lines":

```
(afrinic,ZA,3289085184,4608)
(afrinic,ZA,3289090048,3584)
(afrinic,ZA,3289096192,3840)
(afrinic,ZA,3289103360,256)
(afrinic,ZA,3289104384,3584)
(afrinic,ZA,3289108480,5888)
(afrinic,ZA,3289114624,512)
(afrinic,ZA,3289115392,3840)
(afrinic,ZA,3289119744,768)
(list truncated)
```

The "Uniqueness" algorithm can execute successive operations, such as analyzing the second and following octets for uniqueness relative to the totality of geographic information. Such an operation, not shown here, should be evident based on the information presented here to anyone skilled in the art.

Algorithms of parsing, encoding, optimization, and conversion, having been performed by the Configuration Post-Processing Engine 404 in FIG. 4, the processed information is then stored, either in memory, on the file system, or within a database, for use by the Configuration Post-Processing Engine 404 when analyzing security assertions. For the continuation of this example four formal security assertions are introduced, (Example 13):
BLOCK ZA
ALLOW AO
ALLOW NA
BLOCK BW The geographic security assertions are received by the Configuration Post-Processing Engine 404, FIG. 4, and are sorted by their Device Actions, producing two associated sets, in this example. Additionally, any other processing, such as in the case when the geographic security assertions are supplied in an informal representation from the User Interface Engine 406 or Functional Input Engine 402, is performed so as to convert the informal geographic security assertions into formal geographic security assertions. The two sets of geographic security assertions are then defined in terms of an appropriate low-level representation, as seen in Example 13, the two lists are converted into lists of 32-bit integer addresses in a start addresses, number of contiguous IP address, representation (32-bit Start-End format) (Example 14):

| ALLOW | BLOCK |
|---|---|
| (x lines) | (y lines) |

The "BLOCK" list from Example 14 contains y lines, constituting the y members of the set of 32-bit integer start-end representations derived from converting Examples 4 and 5, which has not been shown but should be evident to one skilled in the art. The members of the "BLOCK list" are, abstractly, a Device Action group. Which for definitional purposes we will call the group (y). The use of (y) as a designator indicates that the group is in a blacklist or "BLOCK" state. The "ALLOW list" is defined as group (x), the (x) designator indicates the group is in a whitelist state, or "ALLOW" state.

The Configuration Post-Processing Engine 404 then performs a size comparison algorithm of the two groups. The result of the comparison returns the smallest group and the degree in size difference. If the difference surpasses a heuristic threshold, then the smaller group is selected. Considering particular threshold values is unimportant, however the purpose of the comparison is to identify the smallest set when the difference is significant, where a significant difference should be clear to anyone skilled in the art. Importantly, the result of this comparison involves checking the state of the Geographic Filtering Engine 408 FIG. 4, where the Geographic Filtering Engine 408 may be in 2 possible filter states.

A "whitelist" state indicates that the low-level constituents populating the geographic filter memory structure specify communication protocol attributes that must be present for network information to pass through the geographic filter. A "blacklist" state indicates the low-level constituents define protocol attributes that must be absent in network information for the network information to pass through the filter. When the low-level constituents are IP addresses in a whitelist state, the constituents specify IP Addresses that are allowed to communicate with protected network objects. When the low-level constituents are IP addresses in a blacklist state, the constituents specify IP Addresses that are not allowed to communicate with protected network objects.

As a result of a geographic filter state check function, the current state of the Geographic Filtering Engine 408 is reported to the Configuration Post-Processing Engine 404 as one of two values: value(y) for "blacklist," and value(x) for "whitelist". Thus the two possible group states (group(x), group(y)) and the two possible filter states (value(x), value (y)), yield four operations for updating the Geographic Filtering Engine 408 with a new set of low-level constituents:

When the state value of the Geographic Filtering Engine 408 is value(x) and when group(x) is significantly smaller than group(y), then group(x) is used to update the Geographic Filtering Engine 408 without executing a filter state change function.

When the state value of the Geographic Filtering Engine 408 is value(x) and when group(y) is significantly smaller than group(x), then group(y) is used to update the Geographic Filtering Engine 408 and a filter state change function is executed.

When the state value of the Geographic Filtering Engine 408 is value(y) and when group(y) is significantly smaller than group(x), then group(y) is used to update the Geographic Filtering Engine 408 without executing a filter state change function.

When the state value of the Geographic Filtering Engine 104 is value(y) and when group(x) is significantly smaller than group(y), then group(x) is used to update the Geographic Filtering Engine 408 and a filter state change function is executed.

The scenario we have presented exemplifies the process by which high-level geographic security assertions are examined, optimized, and finally translated into a low-level set of constituents, which illustrates one narrow embodiment of the present invention disclosed herein. It would be obvious to those skilled in the art that certain changes and modifications to the aforementioned processes and steps do not depart from the scope of the present invention. For example, additional methods of encoding, conversion, and optimization, while differing from those specific means of encoding, conversion, and optimization mentioned herein, do not substantially change the scope of the invention. Moreover, while a particular embodiment of the present invention has been disclosed herein in a limited way, it would be obvious to those skilled in the art that the scope of the invention is not limited to any particular protocol within the IP Protocol family, including encapsulated protocols. The scope of the invention is also not substantially changed by implementation, as one skilled in the art would agree that the processes described herein are neutral with respect to any particular computer system or computer architecture, such that the potential for embodying the method on a variety of different server types or different network devices requires minor changes that do not substantially depart from the scope and method of the present invention.

Since the previous discussion glossed over many of the important engines, modules, and functions of the geographic filter system, a more detailed explanation of each of the major engines, modules, and functions is in order. At the highest level of abstraction, shown in FIG. 1, the present invention consists of the following components: a User Interface Engine 406, a Configuration Post-Processing Engine 404, a Transcoding-Parsing Engine 410, a Functional Input Engine 402, a Geographic Filtering Engine 408, a Network Filtering Engine 412, a Transcoding-Output Engine 414, and a Reporting Engine 416. Each engine consists of one or more modules. Each module may operate in one or more modes, or perform one of more functions. Below, each major engine, module, and function comprising the present invention is described in greater detail.

FIG. 4, a USER INTERFACE ENGINE 406 in which geographic rules and configurations are declared and logging data from geographic filter device operation is displayed to the user in accordance with a number of modalities. The User Interface Engine 406 includes user configurable criteria for displaying logging and reporting information on a graphical world map.

One such criterion is a zoom level, enabling the user to adjust the perspective of the map from among several possible perspectives, including: world perspective, continental perspective, and country perspective, or user-defined perspective using customized Resource Identifiers defined by the user. Adjustments in zoom-level dynamically affect the presentation of data within the map such that only events relevant to the visible surface area of the map are presented, as determined by the zoom level in conjunction with the user configuration pertaining to which types of statistical and operational data should be displayed. Changes in map perspective are context sensitive in accordance with a user's preference between absolute and relative center, such that utilizing a relative center positions the focal point of the map beneath the users mouse cursor, following an actuation of the mouse via a button press. Changes in map perspective are context sensitive in accordance with a user's preference between absolute and relative center, such that utilizing an absolute center positions the focal point of the map in the middle of the Resource Identifier currently selected, following an actuation of the mouse via a button press in accordance with the zoom level. In this way, the user can easily select countries to block or metrics about a country relative to the geographic filter, among other configuration options.

Several facilities within the User Interface Engine 406 allow for specifying geographic security assertions. Geographic security assertions can be defined by the user manually by typing the assertion within a particular window or field. Alternately, the user can employ a graphical world map for defining security assertions by interactively selecting regions and sub-regions and interactively selecting Resource Identifiers and Device Actions in a context sensitive menu.

Another method includes using a geographic security assertion "Wizard" to iteratively define a security assertion by selecting from a number of pre-configured choices and options. The user may also load a configuration file from a stored configuration, representing a previous stored state.

Figure 5:
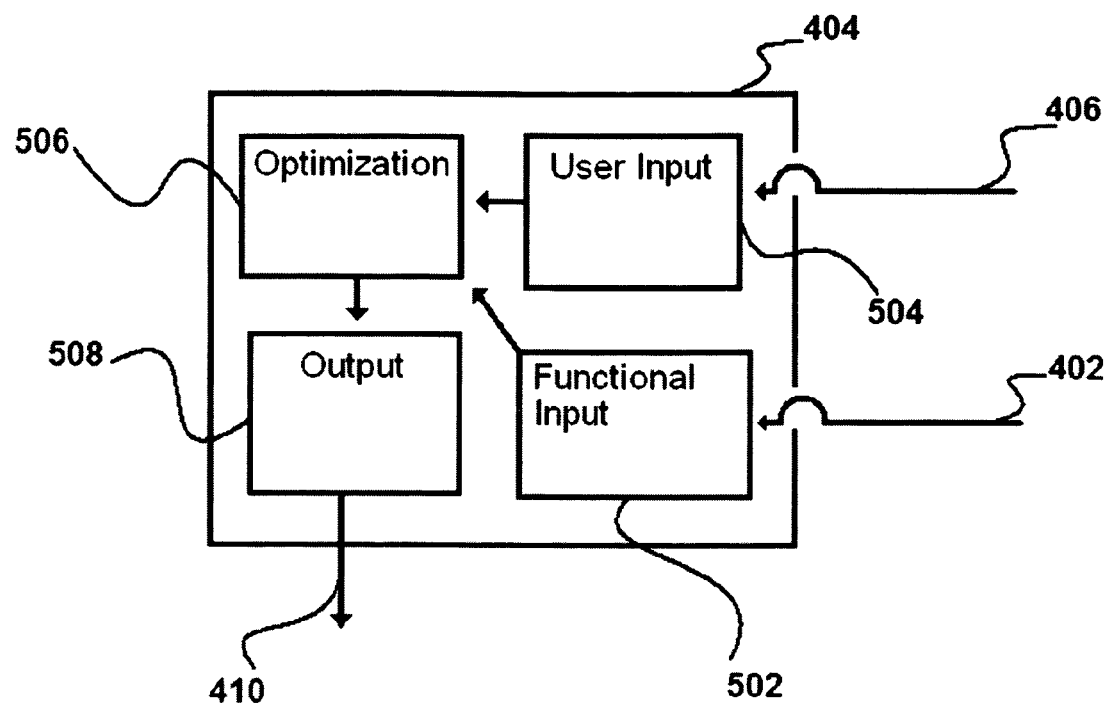
FIG. 5, shows a composition of a configuration post-processing engine.

FIG. 5, a CONFIGURATION POST-PROCESSING ENGINE 404 made up of four separate modules, a Post-Processing Functional Input Module 502, which receives input from the Functional Input Engine 402, a Post-Processing User Input Module 504 which receives and parses input from the User Interface Engine 406 and propagates the result to a Post-Processing Optimization Module 506, the purpose of which is to apply a set of Compression-Abstraction Algorithms to the user-supplied configuration, resulting in a set of optimized device configuration instructions, and, to transmit this information to the Post-Processing Output Module 508, which translates the optimized device configuration instructions into machine instructions suitable for configuring the components functionally linked to the Configuration Post-Processing Engine 404.

Functionally linked to the Configuration Post-Processing Engine 404 are a Transcoding-Parsing Engine 410, a Functional Input Engine 402, and a Network Filtering Engine 412 and a Geographic Filtering Engine 408.

The Configuration Post-Processing Engine 404 performs the high level task of ensuring that configuration information is formatted and optimized for efficient use. The three major types of configuration information are security assertions, the geographic information used for defining those assertions, and the various operational parameters that a user may establish during configuration. Additionally, configuration information is often updated in real-time, such that the security assertions change, or the information for defining those assertions is updated, and/or an operational parameter is changed. One example of an operation parameter might be whether the geographic filter device logs data in one format or another. Another operational parameter might be a mode that controls the overall functioning of the geographic filter device. The Configuration Post-Processing Engine 404 ensures that configuration changes, as well as, types of configuration information, such as input from a geographic database or list, are transmitted to the appropriate geographic filter device engines and components by supplementing the processed and optimized configuration information with meta-information provided by the Output Module 508 that is used to control the flow and utilization of configuration by other engines.

The Configuration Post-Processing Engine 404 has a User Input Module 504 and a Functional Input Module 502, each processing a different type of configuration input. The Functional Input Module 502 provides a interface to the Functional Input Engine 402, with parsing mechanisms unique to the information supplied by that Engine. For example, the Functional Input Module 502 processes information that includes data imported from text files, hypertext-markup language files (.html), or information retrieved from a database via an ODBC or similar protocol. The User Input Module 504 processes other kinds of information, such as security assertions defined within a Graphical User Interface, or via a user's typing into a console window or command shell, or operational parameters supplied by a user during operation through any number of means.

Optimization processes carried out by the Optimization Module 506 include functions for data encoding and decoding, data type conversion, the conversion of IP addresses into alternate representations. In some cases, optimization algorithms may require input from other Engines, such as the Geographic Filtering Engine 408 Associative Module 804. Three specific types of conversion mechanisms for IP Addresses that are employed are converting an IP Address Range into a 32-bit Integer being the start address, and a number corresponding to the number of contiguous IP address (32-Bit Start-End format). Another conversion type is a range notation using a dash within a dotted-quad format (Range Notation). Still another type of conversion is to convert an IP address Range or List into Classes Inter Domain Routing (CIDR) representation. The Perl Script below gives an example of these types of conversion mechanisms:

```perl
!/usr/bin/perl -w
use strict;
# convert address(int),len to CIDR notation
sub intrange2cidr
{
    my @ranges = ( );
    my $start = $_(0);
    my $len = $_(1);
    my $mask = 0;
    my $masked = 0;
    while ($len>0)
    {
            # Find the largest possible mask that we could apply
            # without altering the ip address
            $mask=33;
            do
            {
                $mask--;
                $masked = $start & (2**(32-$mask));
            }
            while ($masked==0);
            # Now work backwards and find the largest
            # mask that is less than or equal to the
            # remaining length
            while ((2**(32-$mask))>$len)
            {
                $mask++;
            }
            # Output the CIDR notation, calcualte the new
            # start address and lengths and continue
            my $complen = (2**(32-$mask));
            my $output = int2ip($start)."/".($mask);
            push(@ranges, $output);
            $len -= $complen;
            $start += $complen;
    }
    return @ranges;
}
# convert X.X.X.X to int
sub ip2int
{
    my @ip = split('\.', $_(0));
    return ($ip(0)*256*256*256)+($ip(1)*256*256)+($ip(2)*256)+$ip(3);
}
# convert int to X.X.X.X
sub int2ip
{
    my $ip = $_(0);
    return
(($ip>>24)%256).".".(($ip>>16)%256).".".(($ip>>8)%256).".".($ip%256);
}
sub output
{
    my $numip = $_(0);
    my $len = $_(1);
    print $numip.",".$len."\n";
    my $sip = int2ip($numip);
    my $eip = int2ip($numip+$len-1);
    my $xip = $sip."-".$eip;
    print $xip."\n";
    foreach (intrange2cidr($numip,$len))
    {
        print $_."\n";
    }
}
my %ips = ( );
if (@ARGV==0)
{
    print "Usage: $0 COUNTRY_CODE\n";
    exit;
}
my $country = $ARGV(0);
open(TMP,"<master.txt");
while (<TMP>)
{
    if (/$country\|ipv4/)
    {
        my @row = split('\|', $_);
        my $len = $row(4);
        my $numip = ip2int($row(3));
        $ips{$numip} = $len;
    }
}
close(TMP);
my $lastnumip = 0;
my $newlen = 0;
foreach my $key (sort {$a <=> $b} keys %ips)
{
    my $numip = $key;
    my $len = $ips{$key};
    if (($lastnumip + $newlen) == $numip)
    {
        $newlen += $len;
    }
    elsif ($lastnumip != 0)
    {
        output($lastnumip, $newlen);
        $lastnumip = $numip;
        $newlen = $len;
    }
    else
    {
        $lastnumip = $numip;
        $newlen = $len;
    }
}
if ($lastnumip != 0)
{
    output($lastnumip, $newlen);
}
print "\n";
```

It should be evident to one skilled in the art that other conversion routines and optimization steps can be used by the Optimization Module 508 without departing from the spirit of the invention.

Figure 6:
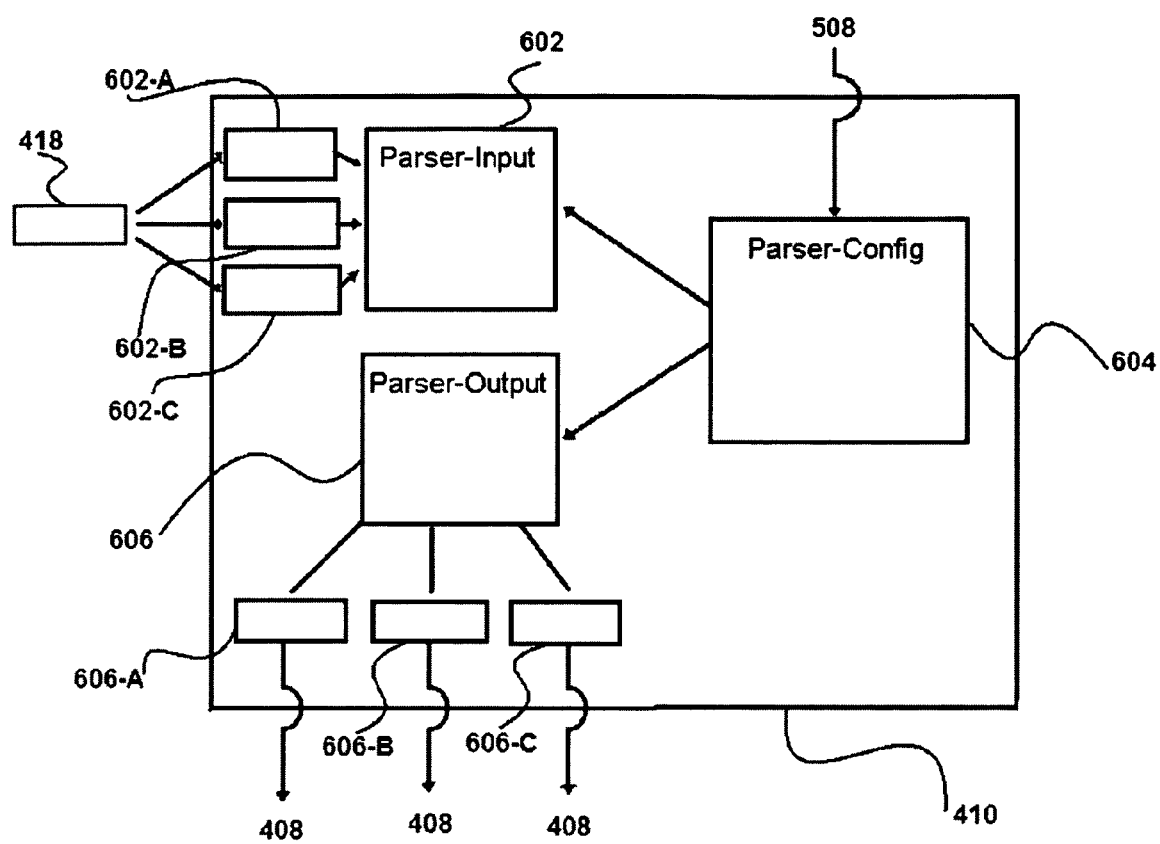
FIG. 6, shows a composition of a transcoding-parsing engine.

FIG. 6, A TRANSCODING-PARSING ENGINE 410 made up of three separate modules: a Parser-Input Module 602, which functions to interoperate and encode portions of the Run-Time Input Medium 418 depending on the Parser Input Mode, a Parser-Output Module 606, which propagates the parsed input to the Geographic Filtering Engine 408 according to a Parser-Output mode, and, a Parser-Configuration Module 604, which receives input from the Post-Processing Output Module 508 and sets the Parser-Input Mode and the Parser-Output Mode.

The Parser-Input Module 602 of the Transcoding-Parsing Engine 410 interprets and encodes portions of the Run-Time Input Layer 418 based on its configuration by the Parser-Configuration Module 604, with respect to which the Parser-Input Module 602 can be configured in three input modes:

Mode 1 602-A being to receive Internet Protocol version 4 or version 6 data packets (IP Layer 3) from either a network interface card (NIC) or Operating System component, such as a kernel memory device or an Operating System device-driver, and to parse the input, extracting and encoding the Source and Destination Address of each of the plurality of data packets received by the Parser-Input Interface.

Mode 2 602-B of the Parser-Input Module (102-A) receives as input a device log or other file matching a supported log or storage format, such as a PCAP log. One example of such a log is the packet capture format (PCAP) supported by the program tcpdump. Another example of a Log format is a web server access log, such as the log generated by the Apache Web Server. Another example could be a list of IP addresses in a text file in CSV format, or stored in Rich Text Format (.RTF), Unicode, or Plain Text file (.txt) file.

Mode 3 602-B of the Parser-Input Module is to receive input from a process, such as from input from another module, or input from another operating system device or process, such as from a TCP socket, or stdin.

The Parser-Output Module 606 of the Transcoding-Parsing Engine 410 sends output to functionally related engines and components based on the configuration supplied by the Parser-Configuration Module 604, with respect to which the Parser-Output Module 606 can be configured to support three output modes:

Mode 1 606-A output propagates an IP Address to the Geographic Filtering Engine 408, with a VALIDATE instruction.

Mode 2 606-B output propagates either an IP Address or ASN (Autonomous System Number) to the Geographic Filtering Engine 408 with a TRANSFORM instruction.

Mode 3 606-C output propagates a optimized rule set in a supported format which is either processed in real-time by the Rules Abstraction Module or passed to the Transcoding-Output Engine.

The three input modes 602-A, 602-B, and 602-C and three output modes 606-A, 606-B, and 606-C are different ways of receiving and processing the full range of possible input that can be received during run-time operation. Rarely will a device operate using all three modes at once, but rather, the different modes correspond to different base configurations. Moreover, many geographic filter device architectures may prefer one mode of operation over another, whereas some geographic filter devices may switch between one or more of the modes dynamically. For example, Input Mode 3 602-C enables a local or host-based geographic filter device to monitor kernel messages or operating system messages. One example embodiment of the present invention would, therefore be, a local geographic filter device utilizes input mode 3 602-C to monitor information contained within the Microsoft Windows 2K/XP "event log" or monitors "/var/log/messages" on linux or unix systems, this functionality, henceforth, will be referred to as operating in local mode. Offline mode, or forensic mode, embodies utilizing Input Mode 2 602-B to perform geographic analysis over network information recorded or logged by a device. In other example embodiment is a Metrics Mode, using Input Mode 602-A, in which network communications are merely monitored, categorized, and statistically analyzed for geographic relationships. In Security Mode, or Policy Enforcement Mode, Input Mode 602-A is used in conjunction with particular geographic security assertions that result in the enforcement of one or more security policy, regulatory compliance, and proactive security models by geographically regulating network traffic.

Figure 7:
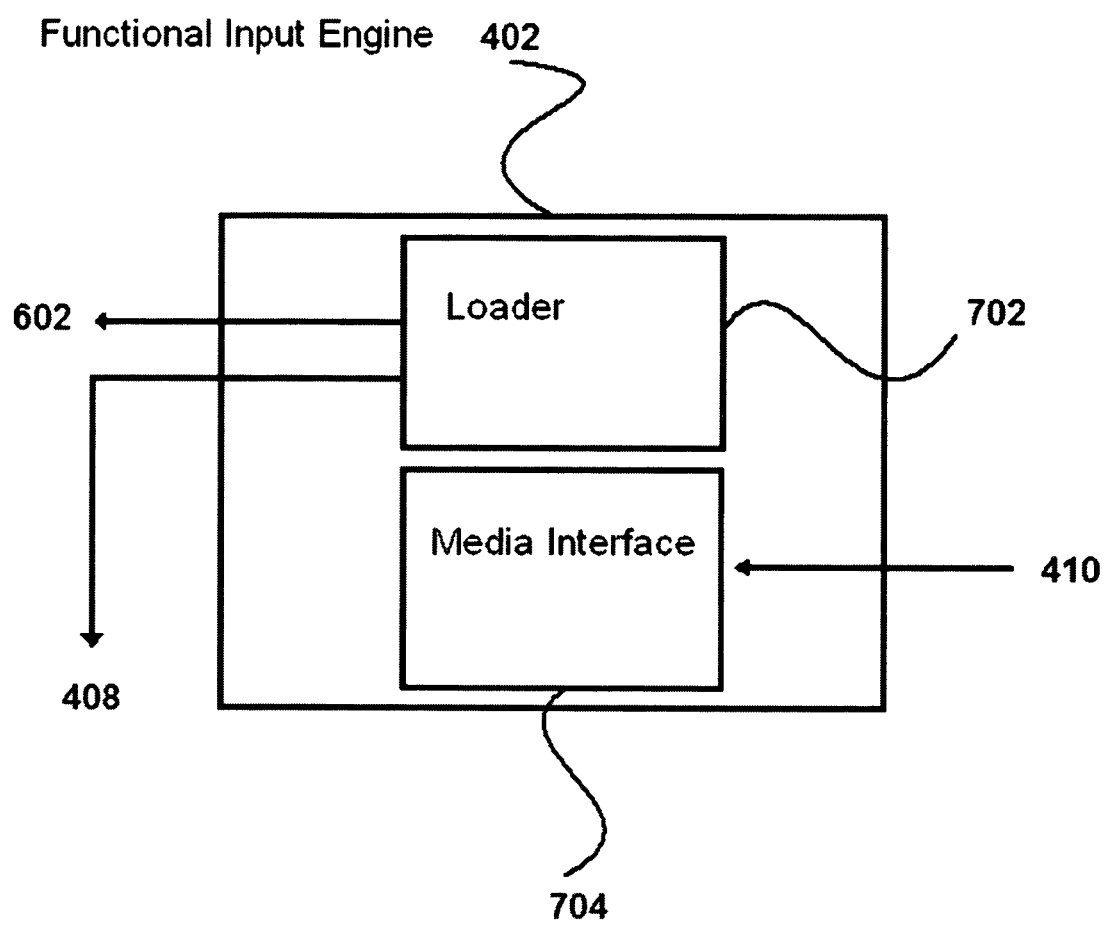
FIG. 7, explains a composition of a functional input engine.

FIG. 7, A FUNCTIONAL INPUT ENGINE 402 comprised by a Loader Module 702 and a Media Interface Module 704. The Media Interface Module 704 performs the processes for opening, reading, or retrieving the desired media type from its location. This module is responsible for reading of the input from a source media, such as a file on the hard-disk. The Loader Module 702 is responsible for loading a media into memory for processing by the Transcoding-Parsing Engine 410. The Loader module receives input from the Media Interface Module 704 and sends its output to the Parser-Input Module 602 which processes the input according to one of three modes 602-A, 602-B, 602-C.

The Functional Input Engine 402 performs initial loading, parsing, and processing of input types that correspond the three Input Modes of the Transcoding-Parsing Engine 410. Unlike the Transcoding-Parsing Engine 410 which uses information processed from kernel messages, device logs, or the network communication layer, the Media Interface Module 704 contains the apparatus necessary to gather information from sources such as kernel messages, device logs, files, or network communications channels. Having the appropriate media interface allows the Functional Input Engine 402 to tap into a particular source of information and make that information available to the Transcoding-Parsing Engine 410, or other functionally related components. The Loader Module 702 extracts the processed information from the media interface and transmits this information to other Geographic Filtering Engines and components.

Importantly, the Functional Input Engine 402 can receive network communications of various types from other geographic filter devices or other network objects. Additionally, the media interface is not passive in this regard, but may query an external device or information source and make this information available to the Transcoding-Parsing Engine 410 or the Configuration Post-Processing Engine 404. Configuration information, for example, can be retrieved from a remote location, including the retrieval of updated geographic information, or information concerning security policy to be implemented by the geographic filter device, additional security assertions from a remote location. The Functional Input Engine 402, thus enables another embodiment of the present invention, a real-time threat feed. Security Assertions are regularly retrieved from another geographic security device or another information processing repository and these security assertions are optimized and loaded based on user configuration, which is, based on the configuration of operational parameters relating to the threat feed.

Figure 8:
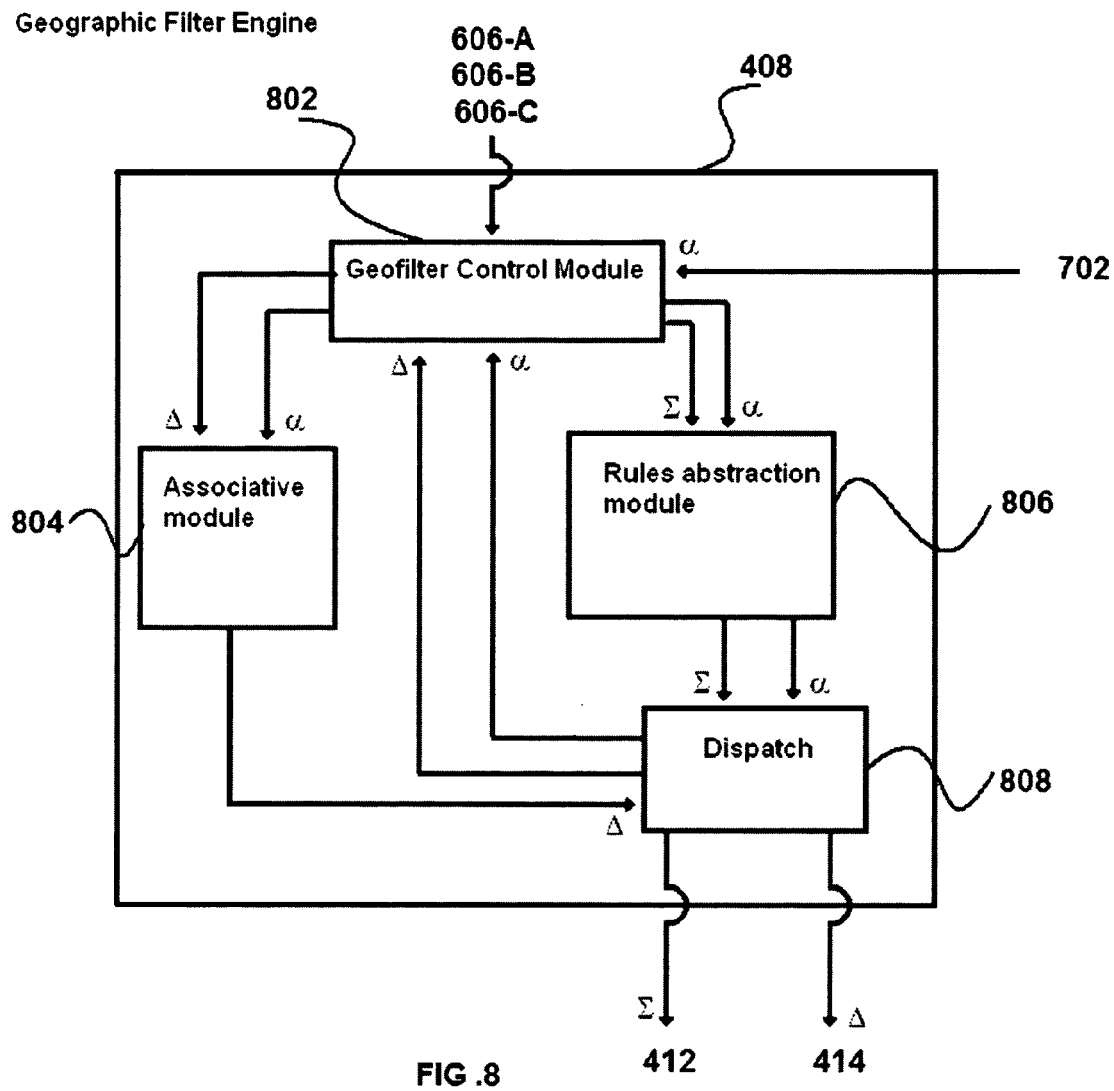
FIG. 8, shows a composition and explains the process of a geographic filter engine.

FIG. 8, a GEOGRAPHIC FILTERING ENGINE 408 is composed of a Geofilter Control Module 802, which receives input from the Transcoding-Parsing Engine 410 in accordance with one of three modes 606-A, 606-B, 606-C, an Associative Module 804, which processes information on request by the Geofilter Control Module (XXX), a Rules Abstraction Module 806, which contains a compact representation of security assertions in the form of low-level constituents, and a Dispatch Module 808, which reports the result of Geographic Filtering Engine 408 functioning to other functionally related engines and components.

The Geofilter Control Module 802 internalizes the Geographic Filtering Engine 408 logic, enabling logical, arithmetic, and associative functions to be carried out by the geographic filter. These logical operations are described here as a Transform Function (delta), a Validate Function (Sigma) and a Populate Function (alpha). Execution of any of these Functions involves transmitting and receiving data from various Geographic Filtering Engine 408 Modules, although the communication pathway between the Modules differs with regard to each Function.

A TRANSFORM FUNCTION, represented in FIG. 8 as (Δ), triggers the Associative Module 804 to calculate a result as part of an associative operation for a given input. A few examples of the types of association operations this module performs are: Resource Identifier to Resource Identifier, IP Address to ASN, IP Address to an ISO Country Code, ASN number to IP Address, ASN number to IP Address, ISO Country Code to IP Network Ranges, Net blocks, or CIDR blocks, and Country Code to ASN numbers. Terms such as "ASN," "ISO Country Code," "Net blocks," or "CIDR blocks," where not previously defined, would be evident to one skilled in the art.

The Associative Module 804 is capable of deriving logical associations between Resource Identifier Groups defined by the user. Thus, any arbitrary Resource identifier defined by the user can be translated and associated with other related information provided the user has input the correct information during definition of the Resource Identifier. Additionally, some associative operations, depending upon the desired result, will be recursive and involve iterative processes of definition and redefinition by the associative module.

A VALIDATE FUNCTION, represented in FIG. 8 as (Σ), triggers the Rules Abstraction Module 806 to search its memory structure contents for a particular IP Address, whereas finding the IP address within the structure constitutes a positive match. Not finding the IP Address within the memory structure results in a negative match. Depending upon the state-value of the memory structure, a positive match triggers a device action, this being determined by the contextual property of storage. For purpose of explanation, consider the Validate Function to return one of two values, a "+" for a positive match, and a "−" for negative match, where positive + indicates the presence of the matched object within the memory structure, and negative indicating the absence of the object from the memory structure. Additionally, value(y) of the memory structure is a blacklist state, and value(x) is a whitelist state. Based on the state-value of the Rules Abstraction Module 806 a device action will be transmitted to the Dispatch Module 808 as a result of the Validate Function. (Σ).

When the state value of the Rules Abstraction Module 802 is value(x) whitelist, or ALLOW) and when the match value is (+), then the contextual property of the memory structure is transmitted to the Dispatch Module 808 as a Device Action Code (DAC).

When the state value of the Rules Abstraction Module 802 is value(y) (i.e. blacklist or BLOCK) and when the match value is (−), then the contextual property of the memory structure is NOT transmitted to the dispatch module as a Device Action Code (DAC), but a "No Operation" is transmitted to the Dispatch Module 808.

When the state value of the Rules Abstraction Module 802 is value(y) and when the match value is (+), then the contextual property of the memory structure is transmitted to the Dispatch Module 808 as a Device Action Code.

When the state value of the Rules Abstraction Module 806 is value(x) and when the match value is (−), then the contextual property of the memory structure is NOT transmitted to the dispatch module as a Device Action, but a "No Operation" is transmitted to the Dispatch Module 808.

A POPULATE (α□) function may be sent to the Geofilter Control Module 802 as a result of new configuration information received from the Configuration Post-Processing Engine 404. The result of a Populate Function loads a data set as input into either the Associative Module 804 or the Rules Abstraction Module 806. The execution of the Populate function also sets the Rules Abstraction Module 806 state value ("whitelist" or "blacklist") and also sets the default state of the Network Filtering Engine 412. Establishing the default state of the Network Filtering Engine 412 synchronizes its operation with that of the Rules Abstraction Module 806. For example, a new set of Rules Abstraction Module information is loaded by a populate function, and the state value of the Rules Abstraction Module is set to "whitelist", or state(x). The Populate Function further sets the default state of the Network Filtering Engine 412 via machine instructions transmitted from the Dispatch Module (808). The default state or baseline state of the Network filtering engine 412 is always to perform the inverse or opposite of Device Action associated with the Rules Abstraction Module's contextual property. Hence, when the Rules Abstraction Module 806 has a contextual property of the Device Action "BLOCK", the Network Filtering Engine 412 is set to the inverse state, "ALLOW". Inverse states are functionally implemented, so that inverse relationships are internalized by the device.

Associative Module 804 consists of one or more in memory constructs capable of performing lookup and cross-referencing on a data set based on the operation type. A few of the operations the Associative Module 804 can perform via a TRANSFORM Function are: Resource Identifier to Resource Identifier, IP Address to ASN, IP Address to an ISO Country Code, ASN number to IP Address, ASN number to IP Address, ISO Country Code to IP Network Ranges, Net blocks, or CIDR blocks, and Country Code to ASN numbers. Terms such as "ASN," "ISO Country Code," "Net blocks," or "CIDR blocks," where not previously defined, would be evident to one skilled in the art.

The Rules Abstraction Module 806 is comprised of a memory structure, which internalizes the low-level constituents of the optimized geographic security assertions. The Rules Abstraction Module 806 state-value is determined by the Configuration Post-Processing Engine 404 and set by the Geofilter Control Module 802. The state-value has a corresponding Device Action Code, which is sent to the Network Filtering Engine 412 on the basis of internal logic pertaining to the Validate Function. The Rules Abstraction Module 06 in response to a Validate Function responds to the Dispatch Module 808 with either a Device Action Code (DAC), referred to previously as the contextual property of the memory structure, or a "No Operation" (NOOP).

The Dispatch Module 808 functions so to output the result of the Geographic Filtering Engine 408 operations to the Network Filtering Engine 412 and related functional components. Output to the Network Filtering Engine 412 may involve transmitting a DAC or NOOP based on a VALIDATION Function. Output to the Transcoding-Output Engine 414 may consist of geographic relationships used during the processing of security assertions or other diagnostic or operational information related to the function of the Geographic Filtering Engine 408. Output to the Geofilter Control Module 802 may consist of return values indicating the need for recursion, or values indicating the completion of either a Populate or Transform function.

Figure 9:
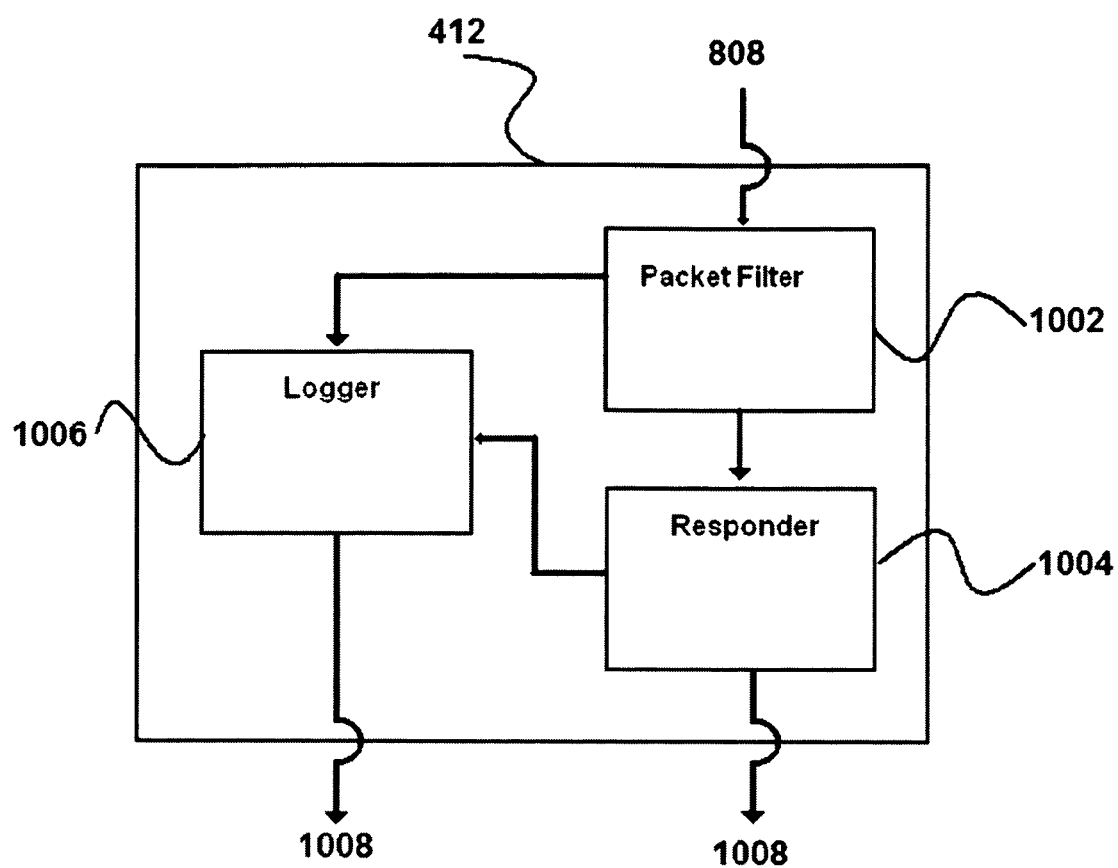
FIG. 9, shows a composition of a network filtering engine.

FIG. 9, The NETWORK FILTERING ENGINE 412 comprised by a Packet Filter Module 1002, a Logger Module 1006 and a Responder Module 1004.

The Packet Filter Module 1002 performs an action upon the incoming data packet as determined by the Rules Abstraction Module 806 DAC associated with the packet. The Packet Filter Module 1002 default state is established by a Populate Function via the Geographic Filtering Engine 408. This default state constitutes the action performed on every data packet received by the Geographic Filtering Engine 408, unless overridden or trumped by the DAC received from the Geographic Filtering Engine 408. The default state of the Packet Filter Module 1002 is always the inverse of the state-value of the Assertion Abstraction Module, but the Packet Filter Module 1002 changes in accordance with any DAC received as a result of a Validate Function, as executed by the Geographic Filtering Engine 408.

The Responder Module 1004 responds to a datagram in a number of ways and may operate in parallel or in the place of the Packet Filter Module 1002, depending upon device coordination. A few of the possible actions are listed below. Note, any action that can be carried out by the Responder Module 1004 has a corresponding DAC, and an inverse value as defined by internal device logic or by a operational parameters that have been established by the user. Example responses are listed below, wherein executing a DAC results in: blocking a particular piece of network information, such that, it is not transmitted by the system to any other network node; allowing a particular unit of network information to traverse the network, in accordance, with its intended destination; redirecting the network information to a user-specified network, network node or subnet; logging the network information or a subset of the information, including the response by the device and other related information; or, sending network information to a network node.

The Logger Module 1006 performs additional logging as related to the Network Filtering Engine 412 function. Other components may generate logs, as well, but the Logger Module 1006 provides an additional logging mechanism, when needed.

Figure 10:
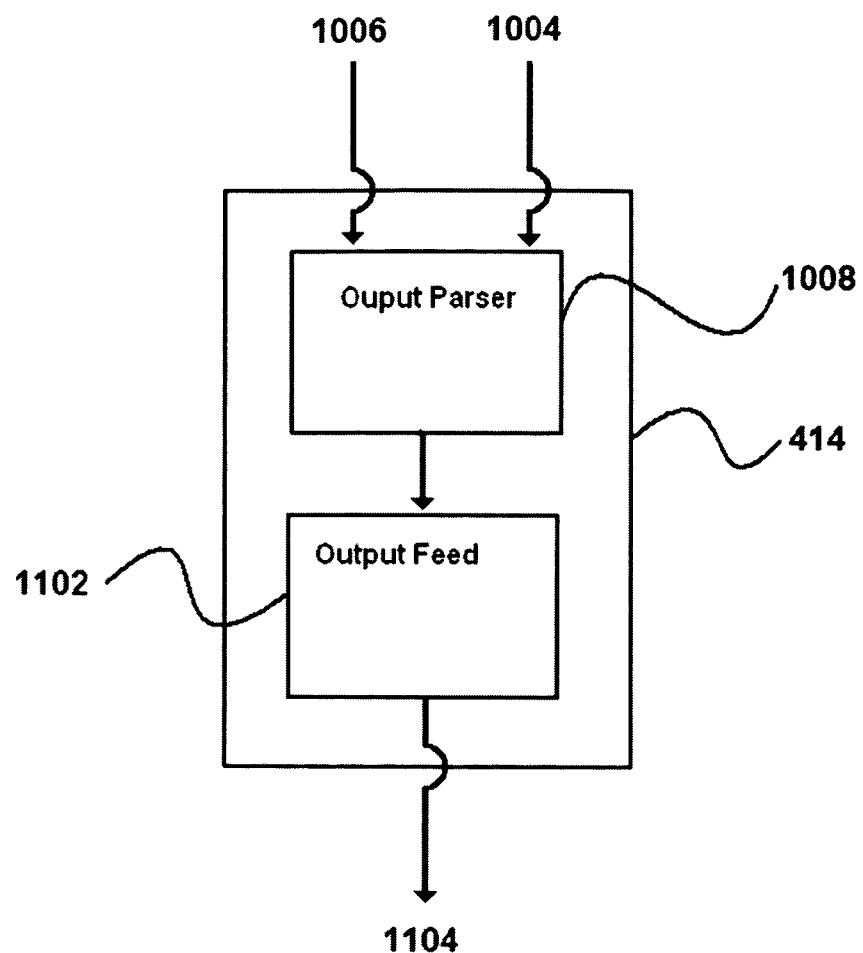
FIG. 10, shows a composition of a transcoding-output engine.

FIG. 10, A TRANSCODING-OUTPUT ENGINE 414 is comprised by an Output Parser Module 1008, which receives input from the Network Filtering Engine 412 Responder Module 1004, and the Network Filtering Engine 412 Logger Module 1006, and an Output Feed Module 1002, which sends information to the Reporting Engine Input Parser Module 1104.

The Output Parser Module 1008 determines the type of log to generate based on the type of information received from the Network Filtering Engine 412. Once the information has been processed, it is made available to the Output Feed Module 1102, which formats the output to the Reporting Engine 416 and, other additional sources, such as operating system components or devices. Many logging formats are supported, and the information is converted into an appropriate format for the desired logging modality prior to transmission to the Reporting Engine 416 by the Output Feed Module 1102. Some of the supported logging formats are listed below:

Generic: Proprietary format specifically designed to house output. One example of this might be to format the output parser results in a proprietary protocol format.

Filesystem: Write files to the file-system rather than, or along with, sending the information to the Reporting Module 416.

Remote (e.g. tcp, udp, http): Connect to a remote system and transmit the logged information using a standard protocol.

Syslog, SNMP: Write the logging information to Syslog or generate SNMP information, based on the configuration of the devices involved.

It should be evident to one skilled in the art that other logging formats and modalities may be implanted by the Output Parser Module 1008 without departing from the scope of the present invention.

Figure 11:
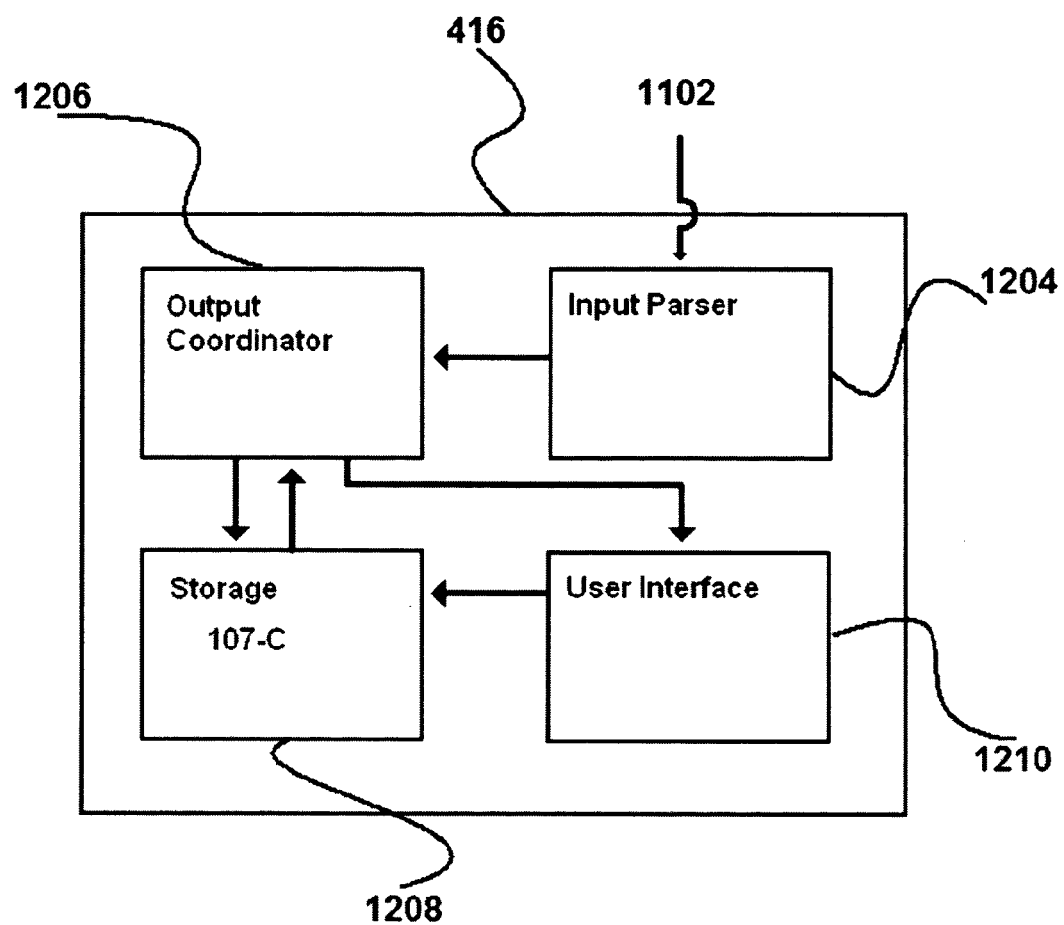
FIG. 11, shows a composition of a reporting engine.

FIG. 11, A REPORTING ENGINE (107) comprised by an Input Parser (107-A), which parses the input type from the Transcoding-Parsing Engine 410 and formats this input according to the reporting, logging preferences. An Output Coordinator (107-B) that determines the output channel through, which received input should be sent, and whether or not the input should be propagated to the UI Module, as well as, where and how the input should be stored. The Output Coordinator also initiates remote contact other systems and servers during the reporting process when network communications are necessary for the reporting functions of the User Interface (107-D) or involved in the storage and retrieval of information. The Storage Module (107-C) contains information that has been persistently stored by the geographic filter, with such storage usually involving storage within a database or file-system. The Storage Module (107-C) as such, is a computer readable medium capable of warehousing the data generated by the geographic filter devices. The User Interface Module 1210 allows the user to interact with the device and view its operation and alter, change, and set, configuration values. The medium through which this interaction occurs may vary depending upon the architecture.

The Reporting Engine 416 consists of a number of modules for the processing of input and output related to user configuration and the reporting of geographic filter operations to the user. The configuration process for a geographic filter requires periodic updates, however, most of these processes are automated by the various engines and modules previously discussed. Configuration directives from the user via the User Interface Module 1210 determine: the channel through which updates occur, when they are to occur, from which sources, the types of sources, such as remote databases via ODBC, FTP Servers, Web Servers, DNS, or via an automated Threat Feed. The User Interface Module 1210 also exposes additional operational parameters to the user, such parameters and variables being configurable within the Reporting Engine. Such parameters and variables include geographic filter device modes of operation, geographic filter thresholds such as those that govern the dynamic transition between whitelists and blacklists, as well as, architecturally related operational parameters concerning such things as IP address ranges of protected network objects and the type and degree of protection conferred.

Importantly, the User Interface Module 1210 includes various interface components, such as an interactive, Graphical User Interface (GUI), as well as, a console or command shell interface. Within the GUI component of the User Interface Module 1210, a user can view device logs, metrics, and statistics, graphically displayed upon a World Map. One property of this world map is a zoom level, enabling the user to adjust the perspective of the map from among several possible perspectives, including: world perspective, continental perspective, and country perspective, or a user-defined perspective using customized Resource Identifiers. Adjustments in zoom, dynamically affect the presentation of data within the map such that only events relevant to the visible surface area of the map are presented.

Changes in map perspective are context sensitive, in accordance, with a user's preference between absolute and relative context, such that utilizing a relative context positions the focal point of the map beneath the users mouse cursor, following an actuation of the mouse via a button press. When utilizing a relative context, the focal point of the map is positioned in the middle of the Resource Identifier currently selected by the user. When using an absolute or fixed perspective, the map is proportioned so that a full set of resource identifiers are always displayed relative to a selected set. For example, selecting the resource identifier "Europe" with an absolute context attempts to position all of "Europe," as defined, within the users view. Statistics, metrics, and device actions are then displayed upon the map, in accordance with the zoom level, the map perspective, and the types of map data chosen by the user.

The User Interface Module 1210 also allows the user to define geographic security assertions within a GUI, utilizing a graphical world map supporting multiple zoom levels, having previously been defined, on the basis of which the user interactively selects previously defined regions, associating one or more of these regions with a Device Action, in accordance, with a means of altering, changing, or setting configuration values. Additionally, other non-geographic means for defining security assertions are provided, including manual console-based specification or through the use of an "Assertion Wizard", which guides the user through the process of defining security assertions informally.

What is claimed is:

1. A device for filtering geographic country of origin information transmitting on a network comprising:
   a first network object capable of receiving information from or transmitting information to a second network object;
   a geographic filtering engine wherein all communication between said first network object and said second network object must pass through said geographic filter engine, comprising:
      a configuration post-processing engine wherein at least one algorithm is applied to at least one geographic country of origin association between a network protocol attribute and geographic country of origin location;
      a rules abstraction module wherein:
         a memory structure stores a set of persistent geographic country of origin associations; and
         at least one compact representation of a security assertion is derived from said set of persistent geographic country of origin associations;
      an associative module performing at least one data process operating to associate a geographic country of origin location pertaining to each network protocol attribute;
      a dispatch module wherein at least one network protocol attribute of said second network object is extracted and compared to said compact representation of a security assertion and the result is provided to the geographic filter control module; and
      a network filtering engine wherein a device action is triggered based on the results provided by said dispatch module, wherein the device action is selected from:
         configured to allow the receipt or transmission of information between said first network object and said second network object;
         configured to block the receipt or transmission of information between said first network object and said second network object;
         configured to allow the receipt of information from said second network object to a third network object determined by said geographic filter engine; and
         configured to allow the transmission of information from said third network object to said second network object determined by said geographic filter engine.

2. The device of claim 1, wherein said algorithm is a conversion algorithm.

3. The device of claim 1, wherein said algorithm is an optimizing algorithm.

4. The device of claim 1, wherein said algorithm is a compression algorithm.

5. The device of claim 1, wherein said algorithm is a parsing algorithm.

6. The device of claim 1, wherein said algorithm is an encoding algorithm.

7. The device of claim 1, wherein said algorithm is a size comparison algorithm.

8. The device of claim 2, wherein said conversion algorithm comprises a compression algorithm.

9. The device of claim 2, wherein said conversion algorithm comprises a 32-bit start-end format, wherein said network protocol attribute is converted into or out of a 32-Bit integer being the start address, and a number corresponding to the number of contiguous IP address.

10. The device of claim 2, wherein said conversion algorithm comprises a range notation, wherein said network protocol attribute is converted into or out of a range notation.

11. The device of claim 10, wherein said range notation comprising a dotted-quad format.

12. The device of claim 11, wherein said dotted-quad format comprises a dash within said dotted-quad format.

13. The device of claim 2, wherein said conversion algorithm comprises a Classes Inter Domain Routing (UDR) representation.

14. The device of claim 3, wherein said optimizing algorithm comprises a combining of contiguous network ranges.

15. The device of claim 1, wherein said geographic filtering engine further comprising a storage module wherein computer readable data is stored.

16. The device of claim 15, wherein said storage module comprising a database.

17. The device of claim 15, wherein said storage module comprising a file-system.

18. The device of claim 1, wherein the contextual property of said memory structure is a whitelist.

19. The device of claim 1, wherein the contextual property of said memory structure is a blacklist.

20. The device of claim 1, wherein said compact representation of geographic security assertion is a table structure.

* * * * *

UNITED STATES PATENT AND TRADEMARK OFFICE
CERTIFICATE OF CORRECTION

PATENT NO. : 9,537,825 B2  
APPLICATION NO. : 14/077116  
DATED : January 3, 2017  
INVENTOR(S) : Aaron J. Kudla et al.

Page 1 of 1

It is certified that error appears in the above-identified patent and that said Letters Patent is hereby corrected as shown below:

In the Claims

Column 26, Line 56, change "(UDR)" to -(CIDR)-

Signed and Sealed this  
Seventh Day of March, 2017

Michelle K. Lee  
*Director of the United States Patent and Trademark Office*